United States Patent [19]

Bildusas

[11] Patent Number: 4,500,021
[45] Date of Patent: * Feb. 19, 1985

[54] RESEALABLE ARTICLES AND PROCESS

[76] Inventor: Leon L. Bildusas, 62 Hampton Rd., Aurora, Ill. 60538

[73] Assignee: Eschem Inc., Downers Grove, Ill.

[*] Notice: The portion of the term of this patent subsequent to Aug. 16, 2000 has been disclaimed.

[21] Appl. No.: 498,255

[22] Filed: May 26, 1983

Related U.S. Application Data

[63] Continuation-in-part of Ser. No. 220,116, Dec. 24, 1980, Pat. No. 4,399,249.

[51] Int. Cl.$^3$ .............................. B32B 3/06; B26F 3/02
[52] U.S. Cl. .................................... 225/49; 225/50; 206/390; 206/447; 428/35; 428/40; 428/194; 428/906; 156/344; 383/86; 383/95
[58] Field of Search ...................... 225/48, 49, 50; 156/344, 299; 428/40, 41, 42, 194; 206/632; 383/86, 95; 281/2, 5; 283/61, 62, 81

[56] References Cited

U.S. PATENT DOCUMENTS

| Re. 30,958 | 6/1982 | White .............................. 428/41 |
| 3,081,276 | 3/1963 | Snyder et al. . |
| 3,239,478 | 3/1966 | Harlan . |
| 3,239,479 | 3/1966 | Roenicke et al. . |
| 3,333,024 | 7/1967 | Haefele et al. . |
| 3,386,846 | 6/1968 | Lones .............................. 428/42 |
| 3,431,323 | 3/1969 | Jones . |
| 3,549,066 | 12/1970 | Wankow ........................ 225/48 |
| 3,595,942 | 7/1971 | Wald et al. . |
| 3,752,304 | 8/1973 | Alef .............................. 428/194 |
| 3,766,295 | 10/1973 | Crossland et al. . |
| 3,792,005 | 2/1974 | Harlan . |
| 3,868,293 | 2/1975 | Selph ............................ 428/40 |
| 3,917,607 | 11/1975 | Crossland et al. . |
| 3,974,947 | 8/1976 | Budny ........................... 225/49 |
| 3,990,627 | 11/1976 | Olson ........................... 229/80 |
| 4,001,167 | 1/1977 | Tungseth et al. . |
| 4,017,436 | 4/1977 | Tabana et al. . |
| 4,028,292 | 6/1977 | Korpman . |
| 4,032,687 | 6/1977 | Hornsby, Jr. .................. 428/194 |
| 4,080,348 | 3/1978 | Korpman . |
| 4,101,484 | 7/1978 | Doss . |
| 4,104,327 | 8/1978 | Inoue et al. . |
| 4,131,709 | 12/1978 | Schunck et al. . |
| 4,260,061 | 4/1981 | Jacobs ........................... 206/632 |
| 4,277,089 | 7/1981 | Lockhart ....................... 283/81 |
| 4,288,480 | 9/1981 | Grzywinski et al. . |
| 4,296,008 | 10/1981 | St. Clair et al. . |
| 4,398,985 | 8/1983 | Eagon ........................... 156/344 |
| 4,415,087 | 11/1983 | Clayton et al. ................ 206/632 |
| 4,420,520 | 12/1983 | Jones et al. ................... 428/42 |

FOREIGN PATENT DOCUMENTS 1083745 8/1980 Canada .
2246036 3/1973 Fed. Rep. of Germany .

OTHER PUBLICATIONS

Shell Oil Co. Bull., "Kraton 1107 Rubber Based Adhesives".
Shell Oil Co. Bull., "Formulations Based on Kraton DE 1112 Rubber".
Shell Oil Co. Bull., "Kraton XG-1657 Rubber".

Primary Examiner—Alexander S. Thomas
Attorney, Agent, or Firm—Lockwood, Alex, Fitzgibbon & Cummings

[57] ABSTRACT

Articles are provided that include pressure sensitive adhesive compositions which are especially suitable for forming contact bonds that are resealable at room temperature. Such adhesive compositions include a blend of a linear or a radial block copolymer, an end-block modifying resin compatible with the end or thermoplastic block of the copolymer and incompatible with the mid or elastomeric block, a plasticizing process oil compatible with the mid or elastomeric block; and, only if desired, not more than about 14 weight percent of a mid block or elastomeric block associating or modifying resin compatible with the mid or elastomeric block and incompatible with the end or thermoplastic block. Articles that particularly advantageously utilize these compositions are thin-walled storage or sandwich bag products made of a polyolefin or other film that has a releasable and resealable sealing strip. Others include peelable labels and note pads and dispensers for thin storage wrap products.

17 Claims, 7 Drawing Figures

U.S. Patent  Feb. 19, 1985  4,500,021
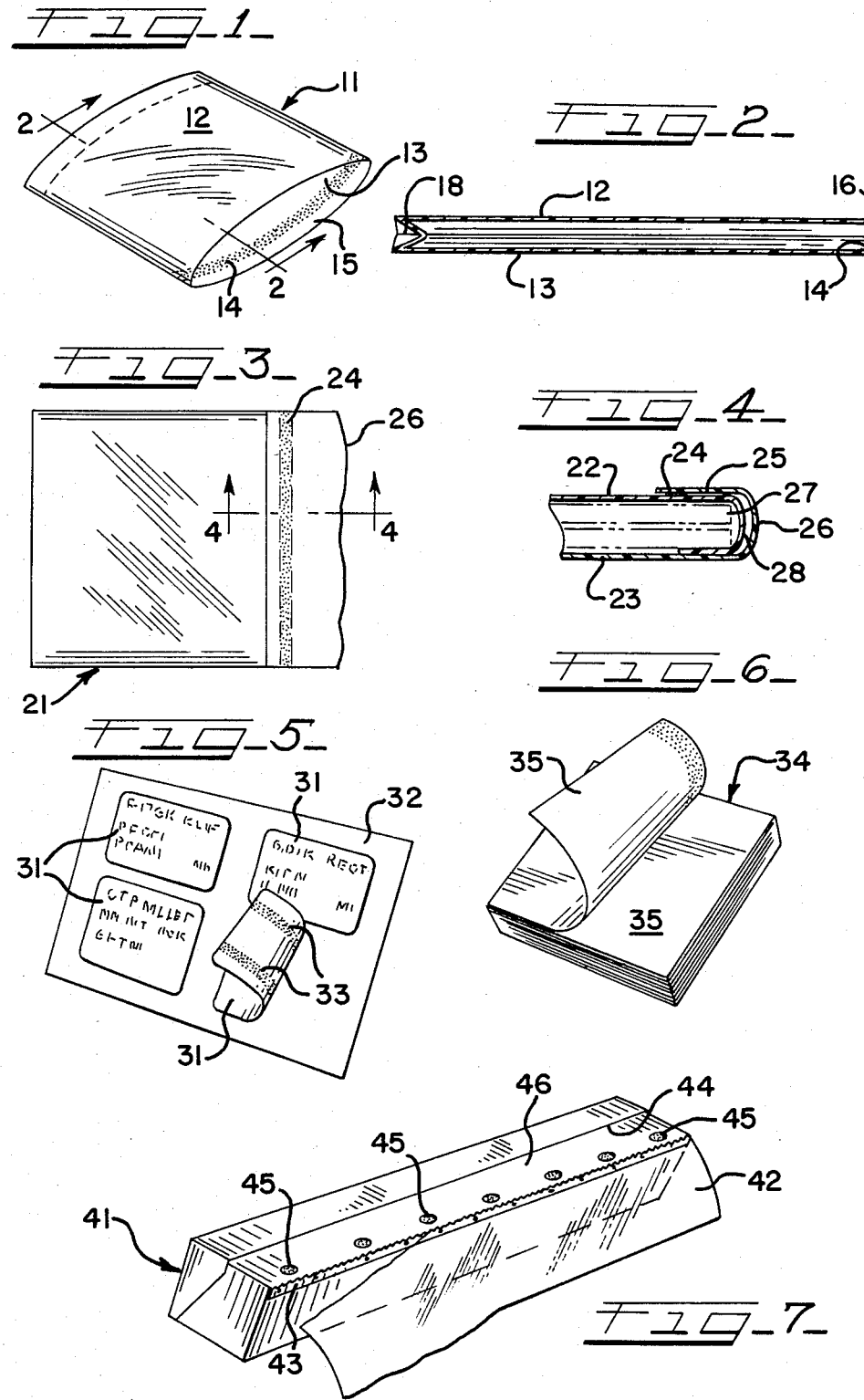

RESEALABLE ARTICLES AND PROCESS

BACKGROUND AND DESCRIPTION OF THE INVENTION

This application is a continuation-in-part of application Ser. No. 220,116, filed Dec. 24, 1980, U.S. Pat. No. 4,399,249.

This invention relates generally to articles having strips or areas of pressure sensitive adhesive composition, more particularly to articles having compositions including a block copolymer, a plasticizing process oil, and substantial quantities of end block or thermoplastic block associating, non-elastomeric resin, the composition being free of or including low quantities of mid block or elastomeric block modifying resin.

Pressure sensitive adhesives are understood in the art to be compositions that will form a bond upon contacting the material to be adhered thereto, without requiring the application of heat, moisture, radiation, or the like. Adhesive compositions of this general type are considered to be resealable and removable when the bond that they form on contact is readily broken, as desired, without significant damage to the substrate to which the resealable pressure sensitive contact adhesive had been applied.

Pressure sensitive adhesives, as described for example in U.S. Pat. No. 3,239,478 and U.S. Pat. No. 3,917,607, often include block copolymers having at least two "A" blocks of a non-elastomeric or a thermoplastic compound and at least one "B" block of an elastomeric compound, together with substantial quantities of a tackifying or mid block modifying resin that is compatible with the elastomeric blocks but substantially incompatible with the non-elastomeric blocks. Such adhesive compositions may also include a thermoplastic or end block modifying resin that is compatible with the end or non-elastomeric blocks and incompatible with the mid or elastomeric blocks, which compositions also often include extending or plasticizing process oils. As far as known, compositions of this general type heretofore have not been suitable as a resealable and removable pressure sensitive adhesive for use on articles that have adequate hold to be readily resealable while still being easily releasable without substantially damaging the article. Particularly difficult problems arise when making articles having generally non-porous surfaces such as those of polyolefin materials, and especially thin polyolefin films including polyethylene films of the type utilized in storage or sandwich bags or the like.

Publications such as Canadian Pat. No. 1,083,745 and the published article "Evaluation of Resins In Kraton ® 1107 Rubber Based Adhesives" teach that the tackifying or mid block associating resins yield soft, tacky films that have potential use in pressure sensitive adhesives, while the incorporation of a thermoplastic non-elastomeric or end block associating resin within a contact adhesive would be expected to provide an undesirably stiff, non-tacky film, thereby teaching one to expect that the pressure sensitive nature of an adhesive depends to a large extent on the mid block associating or tackifying elastomeric resins within the formulation.

Attempts have been made consistent with these teachings to formulate a resealable pressure sensitive adhesive composition suitable for use in connection with polyethylene films and the like, especially those including so-called slip agents, resulting in compositions having poor adhesion to the polyethylene, or having a bond that is too strong, thereby forming a contact bond that is not truly removable because the polyethylene film distorts or tears when attempting to release the contact bond. Some such formulations which initially seem to be acceptable in removal and resealing properties have been observed to change their bonding properties after a short storage time or after exposure to slightly elevated temperatures, as would typically be encountered during transport or storage of various products, such change of bonding properties being detrimental to the ready releasability thereof.

There is, accordingly, a need for articles that include an adhesive composition that has pressure sensitive adhesive properties which is suitable for use as a contact adhesive and that is both removable and resealable when used in conjunction with a variety of surfaces, such as polyolefin surfaces, polyvinyl chloride and polyester surfaces and the like. It has now been discovered that such a composition, which is especially suitable for use in conjunction with low density polyethylene films, is provided by omitting completely or significantly reducing the relative amount of mid block or tackifying elastomeric resin that is included within the modified block copolymer compositions known heretofore. In addition, if the particular block copolymer included within the composition does not have a non-elastomeric block or end block content that is great enough to provide the required removability and resealability properties, the compositions according to this invention further include end block or thermoplastic, non-elastomeric block associating resins that are compatible with the end blocks or thermoplastic, non-elastomeric blocks and incompatible with the mid blocks or elastomeric blocks. Also included is a plasticizing or extending process oil that modifies the mid blocks or elastomeric blocks of the copolymer for achieving suitable removability and resealability.

It is, therefore, a general object of this invention to provide an article having resealable area of an improved pressure sensitive adhesive.

Another object of the present invention is to provide an article having an improved pressure sensitive adhesive strip, dot or area that provides a contact bond which is removable and resealable after the applied adhesive has aged and/or been subjected to moderately elevated temperatures, which conditions would be encountered during normal retail sales channels.

Another object of this invention is an improved product of polyethylene film that has a pressure sensitive adhesive strip which provides a contact seal that is removable without distortion or damage to the polyethylene film while still being resealable.

Another object of the present invention is to provide a polyolefin storage bag having an improved resealable pressure sensitive adhesive strip suitable for providing means to open and sealingly close the open end of the bag.

Another object of this invention is to provide an article utilizing a pressure sensitive adhesive composition that incorporates no mid block associating resin, or only very low quantities thereof.

Another object of the present invention is to provide an improved storage bag having a strip of adhesive applied near the mouth thereof, which applied adhesive has a bond strength with the opposing polyolefin surface of the bag mouth that is on the order of about 80 to 300 grams per inch of width of adhesive, which bond strength is relatively constant over time and/or upon exposure to temperatures as high as about 140° F.

These and other objects of the present invention will be apparent from the following detailed description thereof, taken in conjunction with the accompanying drawings, wherein:

FIG. 1 is a perspective view of one embodiment of a storage bag having a resealable pressure-sensitive adhesive strip in accordance with this invention;

FIG. 2 is a sectional view taken along the line 2—2 of FIG. 1;

FIG. 3 is a plan view of another embodiment of a storage bag having a resealable pressure-sensitive adhesive strip in accordance with this invention;

FIG. 4 is a partial sectional view taken along the line 4—4 of FIG. 3;

FIG. 5 is a perspective view of an embodiment of a peelable label according to this invention;

FIG. 6 is a perspective view of an embodiment of peelable note pads according to this invention; and FIG. 7 is a perspective view of a dispenser for a storage wrap roll, which dispenser includes dots of resealable pressure-sensitive adhesive according to this invention.

Compositions that are incorporated into articles according to this invention include a blend of a block copolymer having at least two end or thermoplastic polymer blocks and at least one mid polymer block, said end block being a non-elastomeric polymer block and said mid block being an elastomeric polymer block, in admixture with an end block modifying resin that is incompatible with the mid block, and a plasticizing process oil compatible predominantly with the mid block. The composition further includes up to 14 weight percent of a mid block modifying resin that is compatible predominantly with the mid block and substantially incompatible with the end block, which resin can be omitted altogether from the composition which nevertheless retains its desired properties.

Any one of a variety of well known block copolymers can be included within the composition, including those discussed in some detail within U.S. Pat. No. 3,239,478 and No. 3,917,607, the disclosure thereof being incorporated hereinto. These particular block copolymers typically take on the general configuration A-B-A or A-B-A-B, wherein each "A" block, which is generally characterized as an end block, is a thermoplastic polymer block prepared by block polymerization of a monoalkenyl arene such as styrene, alphamethylstyrene tert-butyl styrene, and vinyl toluene. The elastomeric "B" blocks, which are characteristically identified as mid blocks, are prepared by block polymerizing a conjugated diene such as butadiene or isoprene and thereafter hydrogenating the polymer block to prepare block polymers such as polybutadiene, polyisoprene and saturated polyolefin blocks, or poly(alpha mono olefin) blocks. Such block copolymers, which are prepared by known procedures, include polystyrene-polybutadiene-polystyrene, or styrene-butadiene-styrene block copolymer (SBS), polystyrene-hydrogenated polyisoprene-polystyrene, polystyrene-isoprene-styrene block copolymer (SIS), poly(alphamethylstyrene)-hydrogenated polyisoprene-poly(alphamethylstyrene), and styrene-ethylene-butylene-styrene block copolymer (SEBS). A typical molecular weight range for such block copolymers is between about 10,000 and 500,000 expressed as average molecular weights.

Another general class of block copolymers included within compositions according to this invention are the radial block copolymers which have radially coupled blocks of elastomeric polymer and non-elastomeric isolated polymer domains surrounded by a continuous phase of elastomeric polymer, with the thermoplastic or non-elastomeric polymer domains being in the nature of end blocks that tie the radial polymers together, thereby reinforcing the radial network of the polymer. Suitable thermoplastic or non-elastomeric blocks include monoalkenyl arenes such as styrene, alphamethylstyrene, tert-butyl styrene, and vinyl toluene and polymers thereof, while the elastomeric blocks include hydrogenated conjugated diene and poly(alpha mono olefin) blocks such as polybutadiene, polyisoprene and saturated polyolefins. A typical radial block polymer of this type is a styrene-isoprene copolymer, and a general average molecular weight range of this type of polymer is between about 50,000 and 500,000.

A further representative class of block copolymers for use in the adhesive compositions are multi-block polymers such as the tetrablock copolymers. Included are tetrablock copolymers that have aromatic units and tapered diene-aromatic copolymer blocks, and the like.

Such block copolymers are present within the compositions according to this invention at a concentration of between about 20 and about 60 weight percent, preferably between about 25 and about 45 weight percent, most preferably between about 30 and 40 weight percent, based on the total weight of the formulation.

End block modifying resins according to this invention are generally non-elastomeric resins that are compatible primarily with the end block, or thermoplastic, non-elastomeric block, and substantially incompatible with the mid or elastomeric block, these end block modifying resins typically belonging to the general chemical class of aromatic, thermoplastic hydrocarbons.

More particularly, incompatibility in this context refers to general incompatibility, indicated by a cloudy film being formed when the blend is cast from toluene solution, between about 50 parts by weight of the end block resin and 100 parts of the mid block of the block copolymer. Compatibility, when used in this context, is indicated by a clear film being formed upon casting from toluene solution of a blend of between at least about 50 parts of the end block associating resin and 100 parts of the end block of the block copolymer. Such end block associating resins can be aromatic compounds having an unsaturated side chain, including alkyl-aromatic thermoplastic hydrocarbon resins, polystyrene resins, alpha-methylstyrene homopolymers, poly-(alpha-methylstyrene-vinyl toluene) copolymers, polyindene resins, metal resinates, coumarone-indene resins, phenolics, mixed aromatics, and the like. Such resins are generally present within the composition according to the invention in order to give a total end block associating resin content of generally between about 5 and about 50 weight percent, preferably between about 10 and about 40 weight percent, most preferably between about 15 and about 35 weight percent, based on the total weight of the composition.

Plasticizing oils or extending process oils are incorporated into the compositions according to this invention to the extent that they are not included within the particular block copolymer formulation utilized, many of such formulations including substantial quantities of oil. Such oils are present in compositions according to this invention in order to soften the set adhesive strip and avoid toughness thereof to enhance the agressiveness of the tack at room temperature and in order to lower the viscosity for enhancing flowability of the compositions during application thereof so that they will readily and adequately wet the surface to which they are being applied. These oils should be those that are compatible with and that will swell the elastomeric blocks or mid blocks and that are substantially incompatible with the non-elastomeric or end blocks; oils compatible with the end blocks, such as highly aromatic oils, will render the compositions gummy and soft and thus unsuitable according to this invention. It is thus an aspect of this invention to combine an end block modifying resin with a mid block compatible oil that is incompatible with such end block modifying resin that does not significantly modify the end blocks of the copolymer.

Suitable oils include petroleum fractions, alkylaryl resins, vegetable oils, animal oils, synthetic low molecular weight polymers or oligomers such as mixed olefin oligomers and polyterpene oligomers, mineral oils, naphthenic oils and paraffinic oils, preferably any such oils in which less than 5 percent, preferably substantially none, of the carbon atoms are aromatic. Most suitable oils will be of relatively low molecular weight, typically between about 200 and 800 average molecular weight. These extending oils, whether entirely added to the composition or whether the block copolymer itself includes extending oils, will be included within the composition in an amount on the order of about a 1:1 weight ratio with the block copolymer, the weight ratio ranging between about 3:1 and about 1:3, with the overall total composition including between about 20 and about 60, preferably between about 25 and about 45 most preferably between about 30 and about 40 weight percent, based on the total weight percent of the composition.

The mid block associating resins, or tackifying resins as they are sometimes referred to, are compatible predominantly with the elastomeric block or mid block and are substantially incompatible with non-elastomeric or end block. These mid block associating resins are compatible with the mid block in that between about 100 and 200 or more parts by weight of the mid block associating resin show a clear film when the particular mid block associating resin is combined with 100 parts of the mid block of the copolymer and cast from solution in toluene. Incompatibility with the end block is indicated by the fact that between about 25 and 50 parts of the mid block associating resin, when cast from solution in toluene with 100 parts by weight of the end block of the copolymer, does not form a clear film.

Typical mid block associating resins include polyhydric esters of rosin or hydrogenated rosin esters, such as glycerol and pentaerythritol esters of hydrogenated rosins and of highly stabilized rosins, esters of polyhydric alcohols, synthetic polyterpenes, terpene-olefin copolymers, terpene-phenols, tall oil rosin, synthetic saturated hydrocarbon resins, such as saturated alicyclic hydrocarbons, olefinic resins, phenol-aldehyde resins, alpha-pinene resins, beta-pinene resins, terpenephenolic resins, and copolymers such as of 1,3-pentadiene and 2-methyl-2-butene.

It is a principal feature of this invention that these mid block associating resins are either completely omitted from the compositions or they are included at only very low levels, the maximum concentration being no more than 14 weight percent, based upon the total weight of the composition, preferably no more than 7 weight percent, and most preferably no more than 5 weight percent. When it is desired to include a mid block associating resin in the compositions according to this invention, they are typically included at concentrations of between about 1 and 7 weight percent, preferably between about 3 and 5 weight percent, based upon the total weight of the composition. Formulations otherwise in accordance with this invention but including over 14 percent by weight of mid block associating resin result in bond strengths that are unacceptable for use as removable and resealable pressure sensitive adhesives on polyethylene surfaces, especially when such surfaces are relatively thin films that are susceptible to distortion and destruction when making and breaking a seal made with compositions including such greater quantities of mid block associating or elastomeric resins.

Most often, it is desirable to include composition-stabilizing additives within the compositions of this invention. Such additives include heat stabilizers such as butyl zimate or butylated hydroxy toluene to retard polymer breakdown at elevated temperatures and inhibitors, antiozonants, ultra violet inhibitors, and/or antioxidants such as mixed phenyl phosphites, tri(nonylated phenyl) phosphite, butylated hydroxy toluene, stearyl thiodipropionate, 2,2'methylene-bis(4-methyl-6-tert-butylphenol), octadecyl beta-(3,5-tertbutyl-4-hydroxyphenyl) propionate, tetra-bis-methylene-3 (3',5-tert-butyl-4'-hydroxyphenyl propionate) methane, modified hindered phenols, 1,3,5-trimethyl-2-4,6-tris(3,5-ditert-butyl-4-hydroxy-benzyl) benzene, 1-2-dihydro-2,2,4-trimethylquinoline polymer, dibetanaphthyl-p-phenylene diamine, 2,4-dihydroxy-benzophenone, substituted hydroxyphenyl benzotriazoles, substituted benzotriazoles, 2-hydroxy-4-(2-hydroxy-3-methacrylyloxy) propiobenzophenone, actylphenyl salicylate, and resorcinal monobenzoate. Additives of these general types are included in concentrations not greater than about 5 weight percent, based on the total weight of the composition, usually between about 0.5 and about 3 weight percent, most typically between about 1 and about 2.5 weight percent of total additives within the composition.

In proceeding with the method according to this invention, between about 20 and about 60 weight percent of a block copolymer is blended with between about 20 and about 60 weight percent of an extending oil and between about 5 and about 50 weight percent of an end block associating non-elastomeric resin, all based upon the total weight of the composition, and the blend is heated until the components are dissolved together. It is often desirable to also include up to about 5 weight percent of one or more preservatives or stabilizers. Mid block associating or elastomeric tackifying resins may be included if desired, provided it is at not more than about 14 weight percent of the total composition. Such formulations are blended and cast or thermally applied to a desired configuration, such as an adhesive strip, area or dot in accordance with generally accepted application procedures, such adhesive area being a contact or pressure-sensitive area that is readily released while also being resealable.

Products or articles in accordance with this invention include an adhesive area applied to the article. Referring to FIGS. 1 through 4, such article takes the form of a storage bag having a closure portion that can be reopened and resealed as desired without damaging or severely distorting the film panels thereof, which are typically a polyolefin material.

The embodiment of FIGS. 1 and 2 includes a reclosable film container, generally designated at 11, having opposing panels 12 and 13 and a strip 14 of pressure sensitive adhesive along a transverse internal edge 15 of one of the panels. The adhesive strip 14 is the composition according to this invention which had been applied by solution casting or by hot melt procedures. Container or bag 11 has an opening 16 at one end thereof at which the adhesive strip 14 is located. The opposite end 17 includes a seal 18 of the panels 12 and 13 together, which seal 18 can be pleated as illustrated, if desired.

Container or bag 21 illustrated in FIGS. 3 and 4 includes opposing panels 22 and 23 and a strip 24 of pressure sensitive adhesive along a transverse edge 25 of one of the panels. In this embodiment, the adhesive strip 24, when applied to an open bag 21, is applied to the external surface thereof, and when the end portions of the panels are folded onto each other as illustrated, the adhesive strip 24 on panel 23 is folded to an internal orientation for sealing engagement with the panel 22. As illustrated, the bag 21 includes a folded edge 26 that closes over an opening 27 of the bag 21. The folded end portions of the panels, and the structure of the panels 22 and 23, are of a known construction whereby an end portion 28 of panel 22 is folded over to initially close the opening 27, and the folded edge 26 of panel 23 is folded over the end portion 28 in order to maintain the closed condition of the bag 21.

Acceptable sealability and unsealability are exhibited by these articles 11 and 21 even when the film substrate of the panels 12 and 13, 22 and 23 incorporates slip agents for improving the handling properties of the completed articles 11 and 21, especially reduction of static clinging together of the panels 11 and 12 or 22 and 23, even when the film is a low density polyethylene.

Referring to FIG. 5, a peelable label 31 is shown being removed from a release sheet 32. The underside of the label 31 includes an area of the adhesive composition according to this invention, such as the strips 33 that are illustrated. FIG. 6 shows a similar article in the form of a pad 34 of peelable note sheets 35 which are adhered to each other by means of a strip of the adhesive composition according to this invention. In both of these embodiments, the basic structural features of the peelable labels and the peelable note pads are generally known.

FIG. 7 illustrates a dispenser, generally designated as 41, of generally known construction, for storing a roll of a thin storage wrap product and for dispensing a length 42 thereof. Dispenser 41 includes a cutting edge 43 located generally outside of an opening 44 through which the storage wrap product is passed for selection of the size of the length 42 desired. An area 45 of the adhesive composition according to this invention, such as the dots shown, is positioned between the opening 44 and the cutting edge 43. By this structure, while the length 42 is being severed by the cutting edge 43, the adhesive area 45 holds a length 46 of the remainder of the roll in place, and the adhesive area 45 then serves to maintain the length 46 in that position until a further length 42 is desired. This latter feature is most advantageous for minimizing the chance that the length 46 will pass back through the opening 44 and become wrapped around the rest of the roll within the dispenser 41.

The following specific examples will more precisely illustrate the invention and teach the procedures presently preferred for practicing the same, as well as the improvements and advantages realized thereby.

EXAMPLE 1

Blended together within a conventional mixing apparatus were about 35 weight percent of an A-B-A block copolymer, about 35 weight percent of a process oil and about 30 weight percent of an end block associating resin, this formulation including no mid block associating resin. The blend was applied by standard hot melt application techniques onto a polyolefin film and allowed to set for about 20 minutes, after which the set adhesive was contact adhered to another portion of the polyolefin film and found to provide a suitable adhesion bond that readily peels away without damaging the film and that is easily resealed by contact.

EXAMPLE 2

About 35.3 weight percent of a styrene-isoprene-styrene block copolymer having a total styrene to isoprene ratio of 14:86, a specific gravity of 0.92, and a Brookfield viscosity of 1600 centipoises at 25° C. for a solution of 25 weight percent of the polymer within toluene, the SIS polymer itself containing no plasticizer oil, such SIS Polymer being blended with about 35.3 weight percent of a paraffinic process oil having a flash point of about 245° C. and a molecular weight of about 530, together with about 29.4 weight percent of polyalphamethylstyrene/vinyl toluene copolymer as an end block, or polystyrene, associating resin having a flash point of about 245° C. and a softening point of 75° C. The resulting blend was cast onto a polyolefin surface from a solution of 45 weight percent solids and 55 weight percent of solvent blend of 20 percent toluene and 80 percent heptane. The casting took the form of an adhesive strip which was subsequently subjected to peel adhesion testing and found to possess an adhesive strength of between about 85 and 140 grams per inch of adhesive strip width.

The peel adhesion test utilized was the PSTC-1 test for single coated tapes in which the seal is made under a uniform pressure, one end thereof is doubled back at an angle of 180°, the adhesive strip is peeled away from the opposing polyolefin surface at a rate of 12 inches per minute, the peel force is measured, the average pull value is obtained during peeling the next two inches of length after the first inch, and the peel adhesion force is calculated in grams per inch of strip width. The test is run under standard conditions at a temperature of 23° C.±2° C. and a relative humidity at that temperature of 50%±2%. Such testing is carried out promptly after application, except when accelerated or high temperature storage conditions are to be simulated, whereupon the substrate and strip are first held at about 60° C. for 16 to 24 hours prior to testing.

EXAMPLE 3

The SIS copolymer of Example 2, about 37.5 weight percent thereof, was blended with about 37.5 weight percent of the plasticizing process oil of Example 2, together with about 25 weight percent of an end block modifying copolymer of alpha methyl styrene and vinyl toluene, such copolymer having flash point of about 285° C. and a softening point of 120° C., the resulting blend cast onto a polyolefin film from toluene and subjected to the PSTC-1 test, the adhesive strength so determined being between 150 and 200 grams per inch of adhesive strip width, the adhesive strip forming an acceptable seal that was both removable and reclosable with minimal distortion of the polyoldfin film, which had a thickness of 2 mils.

EXAMPLE 4

The SIS copolymer of Example 2 was combined in a 1:1 weight ratio with 35.3 weight percent of the plasticizing oil of Example 2, 10.3 parts by weight of the end block associating resin of Example 3 and 19.1 weight percent of the end block associating resin of Example 2, after which the blend was cast, via a toluene hexane solution, onto a polyethylene film including a slip agent within its formulation and having a 2 mil thickness. After the strip had set, it was found to provide a good pressure sensitive seal with an opposing layer of the same 2 mil thick polyethylene film, it further being observed that the seal was removable without any significant distortion of the polyethylene film, the adhesive strength being tested out at about 100 grams per inch of adhesive width.

EXAMPLE 5

About 33.1 weight percent of a styrene-isoprene-styrene was blended with about 33.1 weight percent of the oil of Example 2, about 9.6 weight percent of the end-block associating resin of Example 3, about 17.9 weight percent of the end block modifying resin of Example 2, about 4.8 weight percent of a rosin ester mid block associating resin and about 0.75 weight percent butyl zimate, about 0.37 weight percent of tetra-bis methylene 3-(3,5-ditert-butyl-4 hydroxyphenyl)-propionate, and about 0.37 weight percent of octadecyl 3-(3,5-ditert-butyl-4-hydroxyphenyl) propionate, which blend was cast by hot melt techniques as a strip on the inside surface of one panel of a polyethylene sandwich bag and allowed to set, after which it was aged at about 38° C. at about 55 percent relative humidity. The product was allowed to cool for one hour and was tested at about 25° C. to give a PSTC-1 adhesive strength of about 200 grams per inch of adhesive strip width, the bond having an adhesive peel strength of about 250 grams per inch of adhesive width when tested at about 60° C. The sandwich bag was readily sealed and unsealed without any significant distortion or damage thereto.

EXAMPLE 6

Approximately 40 weight percent of a styrene-isoprene-styrene resin, about 40 weight percent of the paraffinic plasticizing process oil of Example 2, about 12 weight percent of the end block associating resin of Example 3, about 6 weight percent of a mid block associating rosin ester, and about 2 total weight percent of heat and ultra-violet stabilizers are blended together and cast as an adhesive strip onto a polyethylene sandwich bag having a slip agent within the polyethylene formulation, such possessing a bond peel strength of between 250 and 300 grams per inch of adhesive strip width.

EXAMPLE 7

About 35 weight percent of a styrene-isoprene-styrene block copolymer was blended with about 35 weight percent of the extending oil in Example 2, about 10 weight percent of the end block associating resin of Example 3, about 18.5 weight percent of the end block associating resin of Example 2, about 1 weight percent of butyl zimate stabilizer and 0.5 weight percent of butylated hydroxy toluene antioxidant. This composition was cast in toluene to prepare a resealable pressure sensitive adhesive strip near the opening of a polyethylene storage bag, the adhesive strip, when set, providing a reclosable sealing means that does not damage or distort the bag when it is closed and reopened.

EXAMPLE 8

Approximately 31 weight percent of the SIS block copolymer of Example 2, about 31 weight percent of a paraffinic process oil, about 10.5 weight percent of a poly-alpha-methylstyrene/vinyl toluene copolymer end block modifier having a ball-and-ring softening point of about 120° C., about 19 weight percent of a poly-alpha-methylstyrene/vinyl toluene copolymer having 75° C. softening point, about 7 weight percent of a hydrogenated rosin ester having a softening point of about 105° C., about 1.1 weight percent butyl zimate, and about 0.40 weight percent butylated hydroxy toluene. This composition was applied as an adhesive strip to one panel of a polyethylene film sandwich bag near the opening thereof. One such adhesive strip was applied by hot melt application, and another such adhesive strip was applied by solvent from a casting formula having about 45 weight percent of composition solids, about 44 weight percent hexane and about 11 weight percent toluene. Both adhesive strips had satisfactory peel strengths to provide a resealable seal for polyethylene storage bags.

EXAMPLE 9

About 33.5 weight percent of a radial block copolymer having a styrene to isoprene ratio of 16 to 84 and a molecular weight of about 275,000 was blended with about 33.5 weight percent of a paraffinic process oil, 21.7 weight percent of an end block or thermoplastic modifying or tackifying resin comprised primarily of alpha methyl styrenes and having a softening point of about 84° C., together with 9.1 weight percent of a synthetic polyterpene mid block or elastomeric component and 2.2 weight percent butyl zimate. Peel adhesion tests (PSTC-1) on polyethylene gave 110 grams per inch of adhesive strip width and 120 grams after storage at 140° F. for one hour, which values are indicative of good pressure sensitive adhesive properties.

EXAMPLE 10

34.8 weight percent of a styrene-isoprene-styrene block copolymer was blended with 34.8 weight percent of a paraffinic process oil, about 1.1 weight percent butyl zimate, about 1.1 weight percent of octadecyl 3-(3,5-ditert-butyl-4-hydroxyphenyl) propionate uv inhibitor, and about 28.2 weight percent of an end block associating resin that contains polyindene structures, substituted styrenes and substituted indenes and that has a melting point of 100° C. and a flash point of about 250° C. The resulting blended composition exhibited an adhesion to polyethylene film of 210 grams per inch of adhesive strip width.

EXAMPLE 11

A blended composition containing 33.5 weight percent of each of the SIS polymer and the paraffinic oil of Example 2, 2.2 weight percent of stabilizer, 21.7 weight percent of an end block modifier that is largely alpha methyl styrene and that has an 84° C. softening point and 7 weight percent of a synthetic polyterpene mid block associating resin.

While in the foregoing specification, certain embodiments and examples of this invention have been described in detail, it will be appreciated that modifications and variations therefrom will be apparent to those skilled in the art; accordingly, this invention is to be limited only by the scope of the appended claims.

What is claimed is:

1. A storage bag having a releasable and resealable resealing means, said storage bag having opposing film panels, said resealing means being near one edge of one of said panels, an opening located at said one edge, said bag having a closed condition at which said resealing means seals said panels together and closes said opening, said bag having an open condition at which said panels are separated at said opening, said bag being resealable from said open condition to said closed condition and being releasable from said closed condition to said open condition, the improvement comprising said resealing means being an area of resealable and releasable pressure sensitive adhesive composition including:

between about 20 and 60 weight percent based on the total weight of the composition of a block copolymer having non-elastomeric polymer blocks and at least one elastomeric polymer block, each said non-elastomeric block being a monoalkenyl arene polymer block, said elastomeric block being a conjugated diene polymer block;

between about 5 and 50 weight percent based on the total weight of the composition of an end block modifying resin that includes a monoalkenyl arene, said end block modifying resin being compatible predominantly with the non-elastomeric block and substantially incompatible with the elastomeric block;

between about 20 and 60 weight percent based on the total weight of the composition of a plasticizing process oil that is compatible predominantly with said elastomeric block and generally incompatible with the non-elastomeric block of the block copolymer; and not more than about 14 weight percent, based on the total weight of the composition, of a mid block modifying resin that is compatible predominantly with the elastomeric block and substantially incompatible with the non-elastomeric block of the block copolymer.

2. The releasable and resealable storage bag of claim 1, further including up to about 5 weight percent of a composition-stabilizing additive, based on the total weight of the composition.

3. The releasable and resealable storage bag of claim 1, wherein said block copolymer and said process oil are present in the adhesive composition at a weight ratio of approximately 1 to 1.

4. The releasable and resealable storage bag of claim 1, wherein said panels are polyolefin film panels.

5. The releasable and resealable storage bag of claim 1, wherein said panels are low density polyethylene film panels.

6. The releasable and resealable storage bag of claim 1, wherein said composition includes between about 25 and 45 weight percent of said block copolymer, between about 10 and 40 weight percent of said end block modifying resin, and between about 25 and 45 weight percent of said process oil, all as based on the total weight of the composition.

7. The releasable and resealable storage bag of claim 1, wherein said composition includes between about 30 and 40 weight percent of said block copolymer, between about 15 and 35 weight percent of said end block modifying resin, and between about 30 and 40 weight percent of said process oil, all as based on the total weight of the composition.

8. The releasable and resealable storage bag of claim 1, wherein said composition has an adhesive strength to polyolefins on the order of about 80 to 300 grams per inch of width of adhesive area.

9. The releasable and resealable storage bag of claim 1, wherein said adhesive composition includes not more than about 7 weight percent of said mid block modifying resin.

10. The releasable and resealable storage bag of claim 1, wherein said adhesive composition includes not more than about 5 weight percent of said mid block modifying resin.

11. The releasable and resealable storage bag of claim 1, wherein said adhesive composition includes between about 1 and 7 weight percent of said mid block modifying resin.

12. The releasable and resealable storage bag of claim 1, wherein said adhesive composition includes between about 3 and 5 weight percent of said mid block modifying resin.

13. A peelable label having a back face mounted onto a release sheet and a resealing area located on the back face of the peelable label, the improvement comprising said resealing area being a resealable and releasable pressure sensitive adhesive composition including:

between about 20 and 60 weight percent based on the total weight of the composition of a block copolymer having non-elastomeric polymer blocks and at least one elastomeric polymer block, each said non-elastomeric block being a monoalkenyl arene polymer block, said elastomeric block being a conjugated diene polymer block;

between about 5 and 50 weight percent based on the total weight of the composition of an end block modifying resin that includes a monoalkenyl arene, said end block modifying resin being compatible predominantly with the non-elastomeric block and substantially incompatible with the elastomeric block;

between about 20 and 60 weight percent based on the total weight of the composition of a plasticizing process oil that is compatible predominantly with said elastomeric block and generally incompatible with the non-elastomeric block of the block copolymer; and not more than about 14 weight percent, based on the total weight of the composition, of a mid block modifying resin that is compatible predominantly with the elastomeric block and substantially incompatible with the non-elastomeric block of the block copolymer.

14. A pad of peelable sheets, each said sheet having a back face and a resealing area located on each of said back faces of the peelable sheets, the improvement comprising said resealing area being a resealable and releasable pressure sensitive adhesive composition including:

between about 20 and 60 weight percent based on the total weight of the composition of a block copolymer having non-elastomeric polymer blocks and at least one elastomeric polymer block, each said non-elastomeric block being a monoalkenyl arene polymer block, said elastomeric block being a conjugated diene polymer block;

between about 5 and 50 weight percent based on the total weight of the composition of an end block modifying resin that includes a monoalkenyl arene, said end block modifying resin being compatible predominantly with the non-elastomeric block and substantially incompatible with the elastomeric block;

between about 20 and 60 weight percent based on the total weight of the composition of a plasticizing process oil that is compatible predominantly with said elastomeric block and generally incompatible with the non-elastomeric block of the block copolymer; and not more than about 14 weight percent, based on the total weight of the composition, of a mid block modifying resin that is compatible predominantly with the elastomeric block and substantially incompatible with the non-elastomeric block of the block copolymer.

15. A dispenser having a roll of wrapping film therewithin and a resealing area located on said dispenser at a position at which the resealing area adheres a leading portion of the wrapping film thereto, the improvement comprising said resealing area being a resealable and releasable pressure sensitive adhesive composition including:

between about 20 and 60 weight percent based on the total weight of the composition of a block copolymer having non-elastomeric polymer blocks and at least one elastomeric polymer block, each said non-elastomeric block being a monoalkenyl arene polymer block, said elastomeric block being a conjugated diene polymer block;

between about 5 and 50 weight percent based on the total weight of the composition of an end block modifying resin that includes a monoalkenyl arene, said end block modifying resin being compatible predominantly with the non-elastomeric block and substantially incompatible with the elastomeric block;

between about 20 and 60 weight percent based on the total weight of the composition of a plasticizing process oil that is compatible predominantly with said elastomeric block and generally incompatible with the non-elastomeric block of the block copolymer; and not more than about 14 weight percent, based on the total weight of the composition, of a mid block modifying resin that is compatible predominantly with the elastomeric block and substantially incompatible with the non-elastomeric block of the block copolymer.

16. The releasable and resealable dispenser of claim 15, wherein the dispenser includes a cutting edge and a longitudinal opening through which said wrapping film passes, and wherein said resealing area is located between said cutting edge and said longitudinal opening.

17. A process of providing a storage bag having a resealable and releasable pressure sensitive adhesive area, comprising:

blending together an adhesive composition including:

between about 20 and 60 weight percent based on the total weight of the composition of a block copolymer having non-elastomeric polymer blocks and at least one elastomeric polymer block, each said non-elastomeric block being a monoalkenyl arene polymer block, said elastomeric block being a conjugated diene polymer block, between about 5 and 50 weight percent based on the total weight of the composition of an end block modifying resin that includes a monoalkenyl arene, said end block modifying resin being compatible predominantly with the non-elastomeric block and substantially incompatible with the elastomeric block, between about 20 and 60 weight percent based on the total weight of the composition of a plasticizing process oil that is compatible predominantly with said elastomeric block of the block copolymer and generally incompatible with the non-elastomeric block of the block copolymer and not more than about 14 weight percent based on the total weight of the composition of a mid block modifying resin that is compatible predominantly with the elastomeric block and substantially incompatible with the non-elastomeric block of the block copolymer; and applying said adhesive composition to a polyolefin film panel of the storage bag, said adhesive composition being the resealable and releasable area of the storage bag.

* * * * *